M. U. GIOVANNETTI.
DIRECTION INDICATOR FOR AUTOMOBILES.
APPLICATION FILED SEPT. 27, 1920.
1,383,931.
Patented July 5, 1921.
2 SHEETS—SHEET 1.
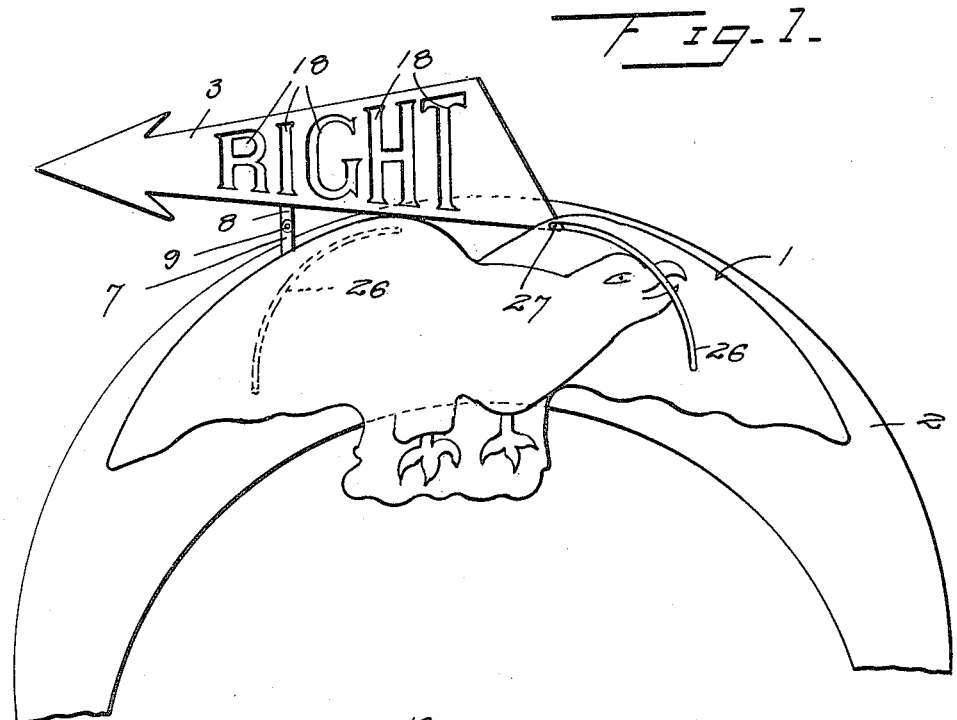
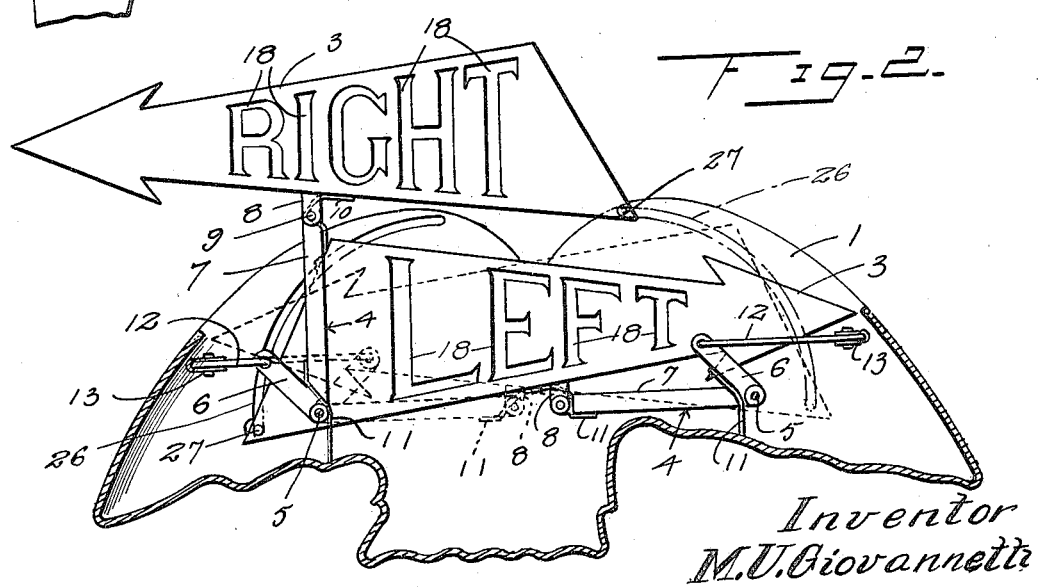
Inventor
M. U. Giovannetti
By

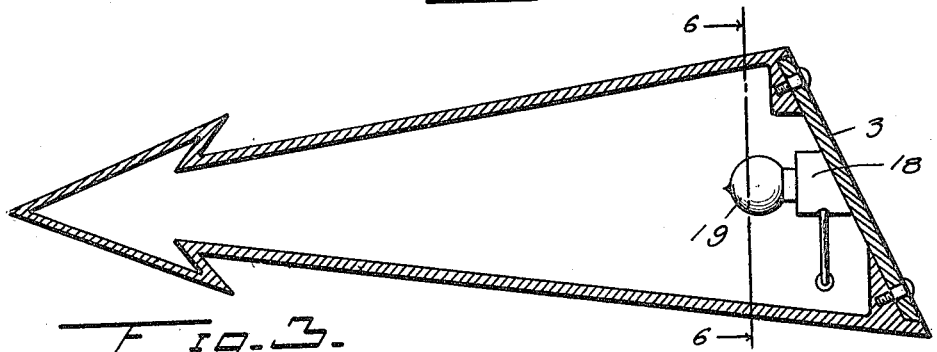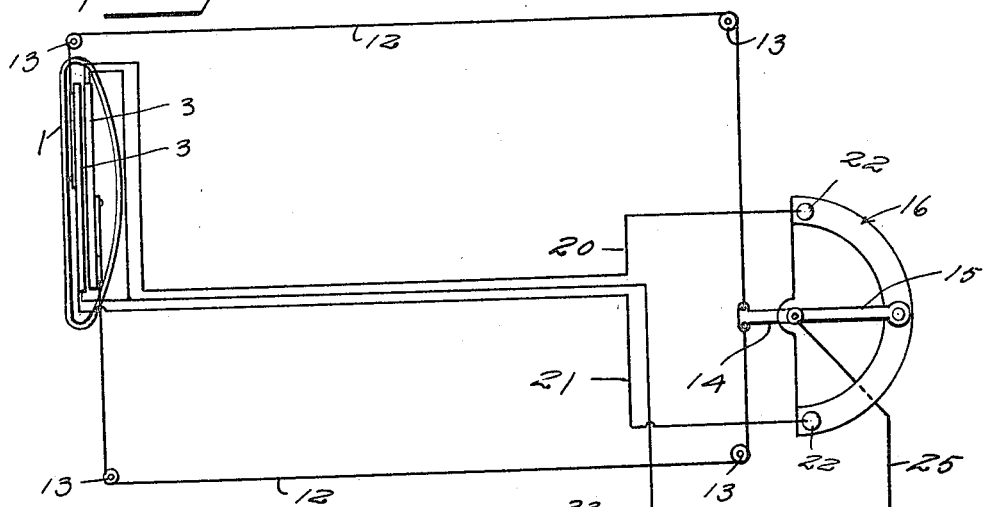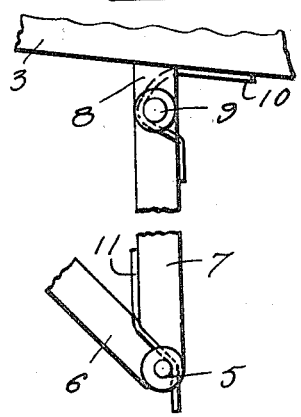

UNITED STATES PATENT OFFICE.

MARIO USAI GIOVANNETTI, OF BRIDGEPORT, CONNECTICUT.

DIRECTION-INDICATOR FOR AUTOMOBILES.

1,383,931.  Specification of Letters Patent.  Patented July 5, 1921.

Application filed September 27, 1920. Serial No. 412,985.

*To all whom it may concern:*

Be it known that I, MARIO USAI GIOVANNETTI, a citizen of the United States, residing at Bridgeport, in the county of Fairfield and State of Connecticut, have invented certain new and useful Improvements in Direction-Indicators for Automobiles; and I do hereby declare the following to be a full, clear, and exact description of the invention, such as will enable others skilled in the art to which it appertains to make and use the same.

This invention relates to new and useful improvements in direction indicators for automobiles and has for its primary object the provision of means whereby the driver of the automobile may easily and quickly move the indicator or signal into signaling position to indicate to traffic a turn from a straight course for preventing collisions or accidents and also to obviate the usual practice of the driver extending the hand or arm laterally of the automobile.

Another object of this invention is the provision of oppositely disposed indicators so mounted in a casing that they are hidden from view when in non-signaling position and which may be quickly moved exteriorly of the casing or into signaling position when desiring to indicate a turn from a straight course in either direction, and when in the latter position will be clearly distinguishable by traffic in the vicinity of the respective automobile.

A further object of this invention is the provision of a direction indicator for automobiles of the above stated character, which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings in which:—

Figure 1 is a front elevation, illustrating a direction indicator applied to a fragmentary portion of an automobile radiator with one of the signals elevated or in a signaling position, Fig. 2 is a vertical sectional view illustrating the same, Fig. 3 is a diagrammatical view illustrating the means of operating the indicators or signals, Fig. 4 is a vertical sectional view illustrating the construction of one of the signals or indicators, Fig. 5 is a detail view illustrating the tension means for the signals or indicators, Fig. 6 is a transverse sectional view taken on the line 6—6 of Fig. 4.

Referring in detail to the drawings, the numeral 1 indicates a casing adapted to be secured to the front of an automobile radiator 2 in any suitable manner and said casing has located therein oppositely disposed indicators or signals 3 and which are movable outwardly of the casing by way of the top wall of the casing. The upper end of the casing is fully open so as to permit free movement of the indicators or signals into and out of the casing. The front wall of the casing is preferably in the shape of an eagle with the wings extended. Bell crank levers 4 are pivoted in the casing as illustrated at 5 and each has a comparatively short arm 6 and a long arm 7. The indicators 3 have formed thereon ears 8 which are in turn pivoted to the long arms 7 of the bell crank levers 4 as shown at 9. The comparatively long arms 7 of the bell crank levers are adapted to rest horizontally within the casing with the indicators disposed over the same. Leaf springs 10 are disposed about the pivots 9 and have one of their ends disposed against the indicators or signals while their other arms bear against the arms 7 of the bell crank levers 4 for the purpose of maintaining the indicators or signals horizontally when elevated or moved into signaling position.

Springs 11 corresponding to the springs 10 are mounted on the pivots 5 of the bell crank levers and one of the ends of the springs bears against the arms 7 and the other end against the casing 1 and is adapted to normally urge the arms 7 into horizontal positions for the purpose of moving the signals or indicators from signaling positions into non-signaling position or within the casing. Cables 12 are connected to the arms 6 of the bell crank levers and extend outwardly of the casing and are trained over a series of pulleys 13 carried by the automobile and are connected to an arm 14. The arm 14 is secured to the pivoted end of a controlling lever 15 and the latter is pivotally mounted and adapted to move over a segment 16 carried by the instrument board of the automobile. The segment 16 and the controlling lever may be located at any other desired point upon the automobile which is in convenient reach of the operator. By moving the controlling lever 15 over the segment in one direction, one of the signals or indicators will move or elevate into signaling position to indicate a turn in one direction and by moving the controlling lever over the segment in an opposite direction, the other signal or indicator will be moved into signaling position. As soon as the lever is returned to a neutral position, the signal or indicator previously having been moved to signaling position will return to a position within the casing by influence of the respective spring 11.

The indicators are of hollow formation and have their sides closed with opaque panels 17 on which are formed transparent characters 18. The characters 18 upon one of the signals or indicators forms the word "Right" to indicate a turn to the right, while the other signal or indicator bears the character "Left" to indicate a turn to the left. The indicators or signals in general outline represent arrows and their enlarged ends carry electric lamp sockets 18 in which electric lamps 19 are located. The electric lamps 19 are disposed within the signals or indicators and have connected thereto conductors 20 and 21. The conductors 20 and 21 are in turn connected to contacts 22 carried by the segment 16. A conductor 23 is connected to a storage battery or other electrical source 24 and to the electric lamps 19. A conductor 25 is connected to the battery or electrical source 24 and to the lever 15 which is insulated from the segment 16 so that upon moving the lever into engagement with either of the contacts 22, the electric lamps 19 will be illuminated. The electric lamps 19 are adapted to be illuminated when the signals or indicators are elevated or moved into signaling position by the controlling lever engaging the contacts 22.

The casing 1 is provided with arcuate shaped slots 26 adapted to receive pins 27 formed on the signals or indicators and are adapted to guide the signals or indicators into and out of the casing and also to maintain the signals or indicators in horizontal position when elevated as the springs 10 bearing against the said indicators will cause the pins 27 to engage the ends of the slots 26.

While I have shown and described the preferred embodiment of my invention, it will be understood that minor changes in construction, combination, and arrangement of parts may be made without departing from the spirit and scope of the invention as claimed.

Having thus described the invention what I claim is:—

1. A direction indicator comprising a casing having its upper end open, and provided with guide slots, bell crank levers pivoted in said casing and one of the arms of said bell crank levers being longer than the other, signals pivoted to the long arms of the bell crank levers and normally resting horizontally within said casing and being disposed in opposite directions, means for swinging the bell crank levers upon their pivots to elevate the signals into a position exteriorly of the casing, pins carried by the signals and extending into the slots to guide the signals into and out of the casing, means for maintaining the signals in horizontal position when elevated, and means for returning the signals to a non-signaling position within the casing.

2. A direction indicator comprising a casing having its top wall open, bell crank levers pivoted in said casing adjacent each end thereof, signals pivoted to the bell crank levers and resting normally within said casing and disposed in opposite directions, means for swinging the bell crank levers upon their pivots to elevate the signals to a position exteriorly of the casing, said casing having arcuate shaped slots, pins carried by said signals and movable in the slots to guide the signals into and out of the casing, and means for returning the signals to a non-signaling position within the casing.

3. A direction indicator comprising a casing having its top wall open, supporting members pivotally mounted in said casing, signals pivotally connected to said supporting members and normally resting within said casing, means for guiding the signals into and out of the casing, tension means for maintaining the signals into horizontal position when elevated, means for moving the supporting members on their pivots to elevate the signals, and tension means for returning the signals to a position within the casing.

In testimony whereof I affix my signature in presence of two witnesses.

MARIO USAI GIOVANNETTI.

Witnesses:
 GENNARO STRIANO,
 EMIL A. NAPOLITANO.